April 25, 1944.  A. J. HIGGINS ET AL  2,347,263
COUPLING HOOK ADAPTED TO DETACHABLY CONNECT
SMALL BOATS TO THE DAVIT FALLS
Filed Aug. 12, 1942  2 Sheets-Sheet 2
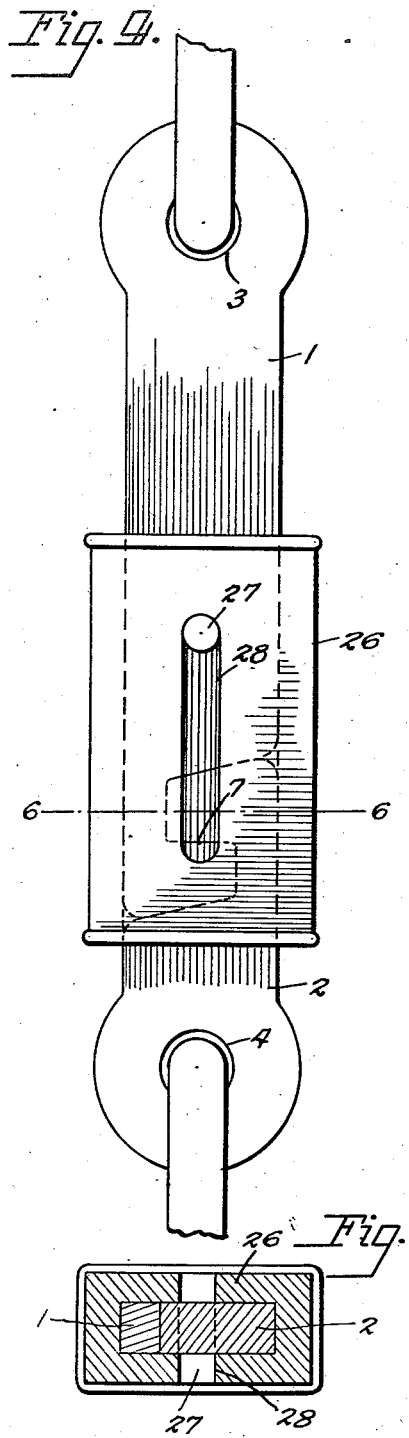
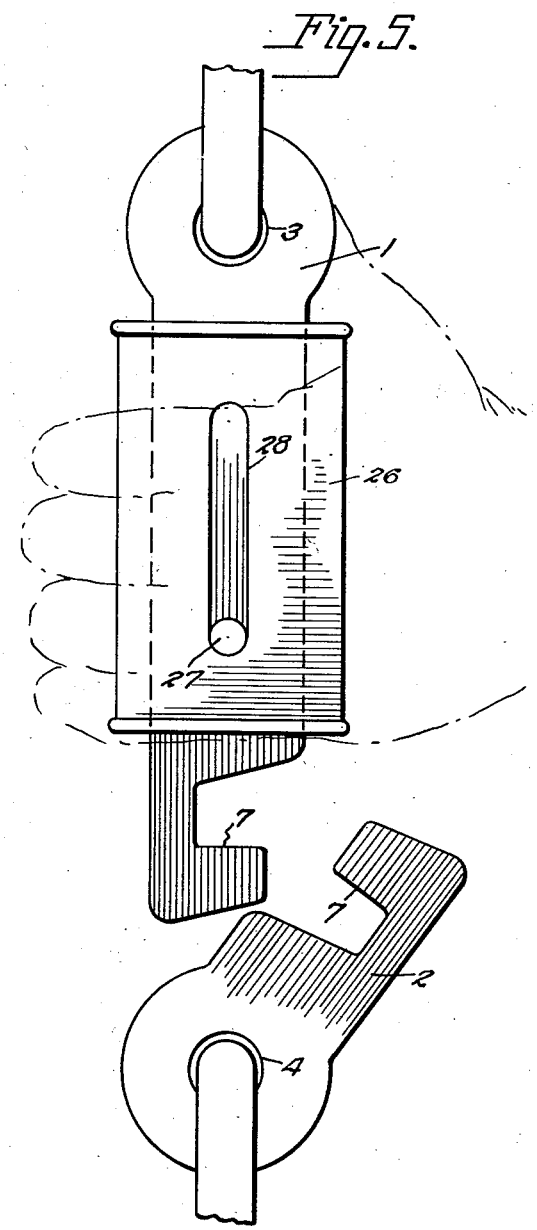
Inventors
A. J. Higgins
J. M. Poche Patented Apr. 25, 1944

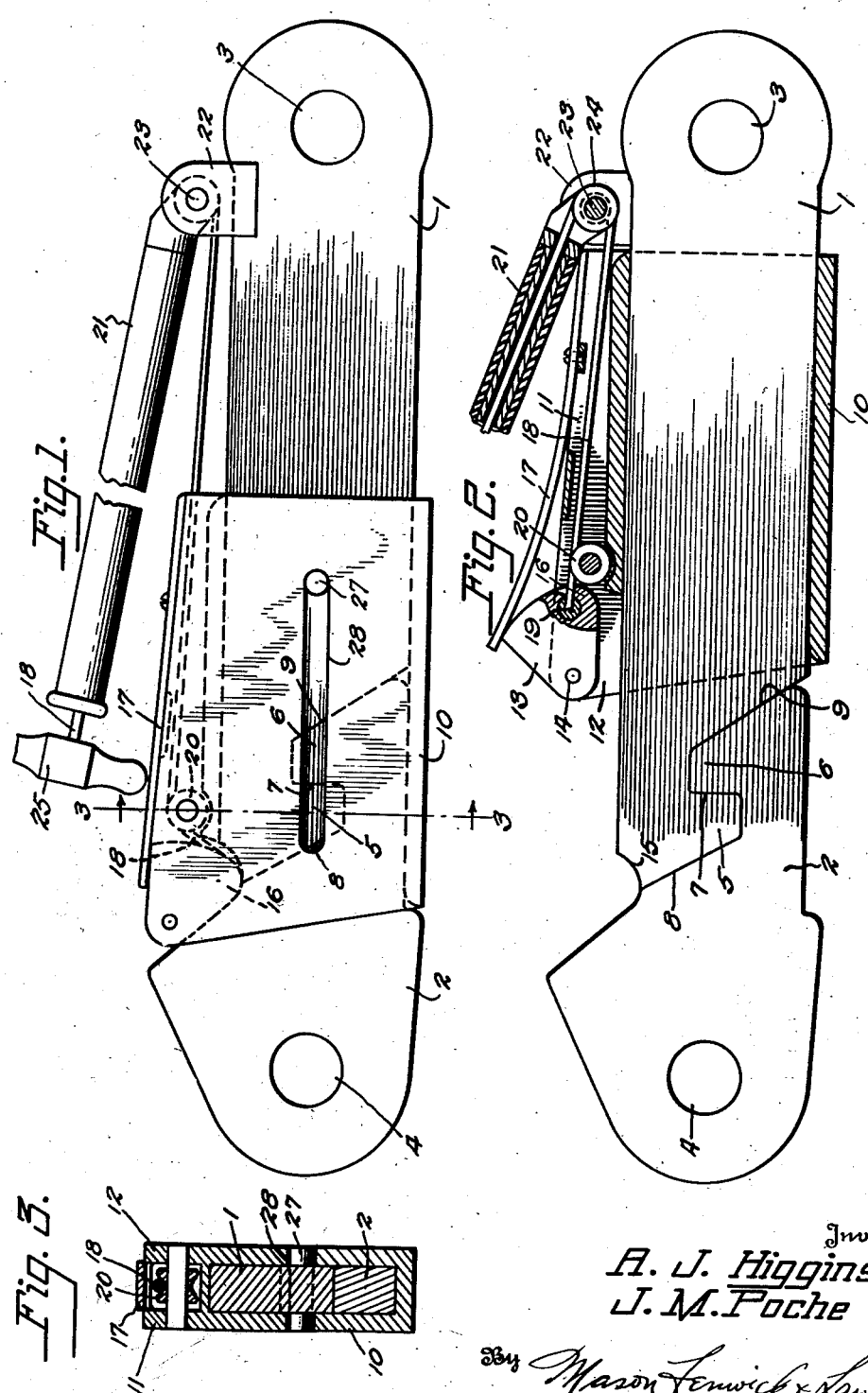

2,347,263

UNITED STATES PATENT OFFICE 2,347,263

COUPLING HOOK ADAPTED TO DETACHABLY CONNECT SMALL BOATS TO THE DAVIT FALLS

Andrew Jackson Higgins and John M. Poche, New Orleans, La.

Application August 12, 1942, Serial No. 454,618

4 Claims. (Cl. 287—104)

This invention relates to a coupling hook adapted to detachably connect a small boat to the davit falls of a carrier vessel. It relates particularly to a hook of the type described, that can be operated by a person standing in the small boat, after the latter has been lowered into the water.

One of the objects of the invention is to provide a coupling hook having interengaging hook elements separable by lateral displacement, and being encompassed by a slidable keeper which normally closely overlies the joint between the interengaged elements but may be slidably moved to expose said joint. In one form of the invention this keeper is released directly by the hand. In another, it is released more remotely by means of a cord or rope acting through a spring-urged pawl which normally latches the keeper in position to retain the hook elements engaged, and which is released by the initial pull on the rope.

Another object of the invention is to provide a coupling hook of the type described, provided with a main handle through which the releasing rope freely passes, said handle being flexibly mounted with respect to the coupling hook, and being designed to be grasped by a person in the small boat, both for the purpose of supporting himself and for bringing the coupling hook into a position accessible for actuation, the movements of which main handle have no releasing effect upon the rope, and an auxiliary handle attached to the end of the rope which extends through the main handle, purposely made of such size and shape and so positioned that it will not be relied upon by the operator to support himself or to draw the coupling hook toward him, and which when pulled first releases the holding pawl and then withdraws the keeper, permitting free lateral relative release movement of the hook elements.

Other objects of the invention will appear as the following description of a preferred and practical embodiment thereof proceeds.

In the drawings throughout the several figures of which the same characters of reference have been employed to designate identical parts:

Figure 1 is a side view in elevation of a coupling hook embodying the principles of the invention;

Figure 2 is a longitudinal view partly in section;

Figure 3 is a view in cross-section taken along the line 3—3 of Figure 1;

Figure 4 is a longitudinal elevational view of a modified form of the invention showing the hook elements latched in engagement;

Figure 5 is a similar view showing the hook elements separated;

Figure 6 is a cross-sectional view taken along the line 6—6 of Figure 4.

Referring now in detail to the several figures, and first adverting to that form of the invention shown in Figures 1, 2 and 3, the reference characters 1 and 2 represent, respectively, the upper and lower coupling members of the hook assembly, the member 1 having an eye 3, adapting it to be connected to the davit falls of a carrier vessel, and the member 2 having an eye 4 by means of which it may be connected to cables attached to the small boat. The adjacent ends of the coupling members 1 and 2 are provided with the interengageable hook elements 5 and 6.

Said hook elements suspend the weight of the small boat and are preferably formed with a load-bearing interface 7 in a plane perpendicular to the line of force transmission through said coupling hook. When the weight of the small boat is on the hook elements 5 and 6 there is no tendency of said elements to slip laterally, in view of the fact that the suspending force is normal to the interface 7. The joints 8 and 9 between the lower and upper faces of the respective hook elements 5 and 6 and the adjacent portions of the coupling members 1 and 2 are oblique with respect to the line of force transmission through said coupling hook, in a direction to permit the coupling members to freely disengage by lateral displacement when the small boat is supported by the water and its weight is thus taken off of the coupling hook.

It is, of course, not desirable that the small boat should automatically be cast off from the carrier vessel as soon as it reaches the water by the free lateral displacement of the hook elements 5 and 6, and it is essential, further, to prevent the hook elements from inadvertently separating while the small boat is being lowered. The coupling hook is therefore provided with a keeper 10, which is of generally tubular form encompassing the coupling members 1 and 2, and slidable longitudinally thereupon. When in its lowermost position, as shown in Figure 1, the keeper 10 surrounds the joint between the hook elements 6 and 7, preventing their lateral displacement. When the keeper 10 is in its elevated position shown in Figure 2, the hook elements 5 and 6 are free to disconnect as soon as the weight of the boat is supported by the water.

At one side the keeper 10 is provided with the spaced flanges 11 and 12, between which a pawl 13 is oscillatably supported upon a pivotal axis 14. The adjacent lower portion of the keeper 10 is cut away or discontinuous, as shown in Figure 2, permitting the pawl when in its inward position to directly engage one of the coupling members. In the illustrated embodiment of the invention it engages the coupling member 1, which is formed with a re-entrant curved portion 15 against which the nose 16 of the pawl rests, as shown in Figure 1. A leaf spring 17 secured to the keeper 10 normally presses the pawl into engagement with the curved face 15. Inasmuch as the point of contact of the nose 16 of the cam with the curve 15 is below the pivotal axis 14 of the cam, the cam will be locked in lowered position and the keeper locked until the cam is lifted.

A cord or rope 18 is anchored to the pawl 13, adjacent the nose 16 thereof, as shown at 19 in Figure 2, said rope being diverted laterally over a roller 20 rotatably mounted between the flanges 11 and 12. When the rope or cord 18 is pulled, its first action is to tilt the pawl away from the curved face 15 of the coupling member 1, releasing said coupling member. The rope is then substantially in a straight line with the axis 14 of the pawl 13, so that further pull upon the rope 18 moves the keeper slidably upward to its release position shown in Figure 2. When the rope is released, the spring 17 forces the pawl 13 back into engagement with the coupling member 1, so that when the hook elements 5 and 6 are again brought together and the keeper 10 moved slidably downward, the pawl 13 springs into the depression defined by the curved face 15, again latching the keeper 10 in position to keep the coupling members 1 and 2 in engagement.

It will be readily understood by those experienced in the launching of small boats from vessels that when the small boat reaches the water it is frequently set into violent rolling and pitching, due to turbulence of the seas, so that the sailor in the small boat whose duty it is to tend the coupling hook may have great difficulty in maintaining his balance. Furthermore, as soon as the small boat reaches the water the slackening of the tackle may cause the coupling hook to swing wildly about the heads of the occupants of the small boat, with the danger of braining them unless its movements are restrained. Consequently, it is essential for the tender of the hook, both for the sake of supporting himself as well as having command of the movements of the hook, to catch hold of the coupling hook before the small boat reaches the water.

For this purpose the coupling hook is provided with a main handle 21, which is flexibly secured to the coupling hook by means of spaced lugs 22 fixed to the coupling member 1, between which the upper end of the handle is hingedly journalled on a pin 23, which bridges the space between said lugs, and is carried by said lugs. The handle 21 is preferably an elongated tubular member which the tender of the hook may conveniently reach for and grasp, and which can move more or less rhythmically with respect to the movements of the small boat and relative to the coupling hook at the same time putting the swinging movements of the coupling member under the control of the sailor who is tending the same.

It is quite as important that the handle which the sailor grasps and by means of which he restrains the swinging of the coupling hook shall not be instrumental in releasing the keeper 10. If this were to occur before the small boat has reached the water the joint between the coupling members would be inadvertently exposed, and the lurching of the tackle might cause release of the hook elements of the coupling member and the dropping of the small boat with its occupants into the water. In the designing of the coupling hook of the subject invention, great care has been taken that the movements of the handle 21 shall be inert with respect to the pulling of the release rope 18. Said rope passes around a roller or pulley 24, which is journaled upon the same axis of rotation as that of the handle 21, and then passes down through said handle, extending below the free end of said handle. It is obvious that the hinge movements of said handle will not impart any pull to the rope 18.

An auxiliary handle 25 is attached to the extended end of the rope 18, and it is this handle which when pulled transmits the release motion through the rope 18. The handle 25 is in immediate proximity to the handle 21 but at the same time it is designedly so shaped and so placed that it would not be relied upon by the sailor to support himself or to control the oscillations of the coupling hook and tackle. The tender of the hook firmly holds the handle 21 until the small boat rests upon the water, whereupon he immediately pulls the handle 25, releasing the pawl 13, raising the keeper 10 and releasing the coupling members. He then maintains his hold upon the handle 21 until the small boat gets under way, so that the coupling hook can be let go without endangering the occupants of the boat.

Referring now to that form of the invention shown in Figures 4 and 5, a simplified form of coupling hook is shown in which the coupling members 1 and 2 are similar to the corresponding parts shown in Figures 1, 2 and 3, excepting that, there being no latching pawl 13, the recess 15 is omitted. The two coupling members have the same load-bearing interface 7 perpendicular to the line of force transmission of the load, and are released by lateral displacement, as shown in Figure 5. In this form of the invention a keeper 26 is provided, slidable upon the coupling members 1 and 2 into a position in which it overlies the joint between the interdigitated ends of said coupling members, and being elevatable, as shown in Figure 5, to a position in which the hooked ends of the coupling members are exposed and readily released as soon as they are released from the weight of the suspended small boat. The sleeve is retained upon the coupling member 1 and its range of sliding movement is limited by a pin 27 fixed to the member 1, playing in a slot 28 formed in the side of the keeper. In this form of the invention the keeper is manipulated directly by hand, without the provision of any remote control means or any latch.

While we have in the above description disclosed what we believe to be a preferred and practical embodiment of our invention, it will be understood to those skilled in the art that the details of construction and the arrangement of parts as shown and described are by way of example and not to be construed as limiting the scope of the invention as defined in the appended claims.

What we claim is:

1. Coupling hook comprising interengageable coupling members, a latch inhibiting disengagement of said members, a cord connected to said latch for releasing said latch when said cord is pulled, and a hollow handle flexibly connected to one of said coupling members, through which said cord passes, affording support to the tender of said coupling hook and being inert with respect to latch releasing movement of said cord.

2. Coupling hook comprising interengageable coupling members, disengageable by relative lateral displacement, a latch sleeve slidably fitting upon said coupling members adapted to overlie the joint between them when engaged, to inhibit lateral displacement of said members, a hollow handle hinged to one of said members affording support for the tender of the coupling hook, a cord attached to said latch sleeve for lifting said sleeve to expose the joint between said coupling when said cord is pulled, said cord passing through said handle, the latter being inert with respect to the releasing movement of said cord.

3. Coupling hook comprising a pair of coupling members having longitudinal portions forming a guide, and having interdigitating ends, laterally displaceable for disconnecting said members, a keeper sleeve slidable upon said guide into position overlying the joint between said ends to prevent their relative lateral movement, and latching means for said coupling hook comprising a pawl carried by said keeper sleeve, spring-pressed into a recess in said guide for holding said keeper sleeve in its joint overlying position, and a flexible pulling member attached to said pawl adapted to extend remotely from said coupling hook and releasing said pawl and sliding said keeper sleeve to a position exposing said joint.

4. Coupling hook comprising a pair of coupling members having longitudinal portions forming a guide, and having interdigitating ends, laterally displaceable for disconnecting said members, a keeper sleeve slidable upon said guide into position overlying the joint between said ends to prevent their relative lateral movement, and having spaced longitudinal flanges extending from one side thereof, latch means for said coupling hook comprising a pawl journaled between said flanges having a nose fitting a recess in said guide for holding said keeper sleeve in its joint overlying position, a spring carried by said keeper sleeve normally pressing said pawl into engagement with the face of said recess, and a flexible pulling member attached to said pawl adapted to extend remotely from said coupling hook for releasing said pawl and sliding said keeper sleeve to a position exposing said joint, and a roller journaled between said flanges about which said pulling member passes, positioned to divert that portion of the pulling member between said roller and pawl toward the direction of rotation of said pawl.

ANDREW JACKSON HIGGINS.
JOHN M. POCHE.